(12) United States Patent
Luna

(10) Patent No.: US 9,301,505 B1
(45) Date of Patent: Apr. 5, 2016

(54) ANIMAL RESTRAINT DEVICE

(71) Applicant: John Luna, Hesperia, CA (US)

(72) Inventor: John Luna, Hesperia, CA (US)

( * ) Notice: Subject to any disclaimer, the term of this patent is extended or adjusted under 35 U.S.C. 154(b) by 92 days.

(21) Appl. No.: 14/173,061

(22) Filed: Feb. 5, 2014

(51) Int. Cl.
*A01K 27/00* (2006.01)

(52) U.S. Cl.
CPC ............ *A01K 27/002* (2013.01); *A01K 27/003* (2013.01)

(58) Field of Classification Search
CPC ............................... A01K 27/003; A01K 27/00
USPC .................................................. 119/793, 792
See application file for complete search history.

(56) References Cited

U.S. PATENT DOCUMENTS

| | | | | |
|---|---|---|---|---|
| 2,187,021 | A | | 1/1940 | Everson |
| 2,861,547 | A | * | 11/1958 | Dale ............... 119/797 |
| 3,768,445 | A | | 10/1973 | Sorrels |
| 4,019,463 | A | * | 4/1977 | Kitchen ........... 119/793 |
| 4,763,609 | A | * | 8/1988 | Kulik ............... 119/797 |
| 5,005,527 | A | * | 4/1991 | Hatfield ........... 119/793 |
| 5,099,799 | A | * | 3/1992 | Giacobbe ......... 119/793 |
| 5,351,654 | A | * | 10/1994 | Fuentes ........... 119/770 |
| 5,359,964 | A | | 11/1994 | Sporn |
| 5,383,426 | A | * | 1/1995 | Krauss ............ 119/793 |
| 5,456,213 | A | * | 10/1995 | Beauchamp ...... 119/793 |
| 5,497,733 | A | * | 3/1996 | Hull et al. ........ 119/793 |
| 5,551,380 | A | * | 9/1996 | Hodgson ......... 119/795 |
| 5,791,295 | A | * | 8/1998 | Schmid et al. .... 119/793 |
| 6,053,128 | A | * | 4/2000 | McCulloch ....... 119/792 |
| 6,085,694 | A | | 7/2000 | Simon |
| 6,662,753 | B1 | * | 12/2003 | Sporn ............. 119/797 |
| 6,675,742 | B1 | * | 1/2004 | Shiraki ........... 119/797 |
| 6,971,334 | B1 | * | 12/2005 | Livesay et al. ... 119/798 |
| 7,103,943 | B2 | * | 9/2006 | Lambert ........... 24/298 |
| 7,640,895 | B2 | * | 1/2010 | Fountoulakis et al. ... 119/795 |
| 7,938,086 | B2 | * | 5/2011 | Cobb et al. ...... 119/770 |
| 8,100,090 | B1 | | 1/2012 | Sutter |
| 8,327,808 | B2 | * | 12/2012 | Chirico ........... 119/792 |
| 8,459,212 | B2 | | 6/2013 | Meisenbach |
| 8,505,495 | B2 | * | 8/2013 | Wang .............. 119/797 |
| 9,032,910 | B2 | * | 5/2015 | Sandler ........... 119/793 |
| 2012/0037091 | A1 | * | 2/2012 | Wang .............. 119/793 |
| 2012/0060768 | A1 | * | 3/2012 | Sandler ........... 119/793 |
| 2013/0074782 | A1 | | 3/2013 | Marran |
| 2013/0133591 | A1 | | 5/2013 | Silva et al. |

FOREIGN PATENT DOCUMENTS

JP 2010166841 8/2010

* cited by examiner

*Primary Examiner* — Kristen C Hayes

(57) ABSTRACT

An animal restraint device restrains an animal and is adjustable to fit the animal as the animal grows. The device includes a flexible strap having a first end, a second end and a medial portion coupled to and extending between the first end and the second end. The medial portion is configured to extend around a neck of an animal to form a first loop around the animal's neck. The medial portion is configured to extend around a midsection and a back of the animal to form a second loop around the animal's back and midsection. A first connector is coupled to the medial portion. A second connector is coupled to the second end. The first connector is removably couplable to the second connector for securing the strap in a restrained position around a body of an animal.

8 Claims, 4 Drawing Sheets

ANIMAL RESTRAINT DEVICE

BACKGROUND OF THE DISCLOSURE

Field of the Disclosure

The disclosure relates to restraint devices and more particularly pertains to a new restraint device for restraining an animal and that is adjustable to fit the animal as the animal grows.

SUMMARY OF THE DISCLOSURE

An embodiment of the disclosure meets the needs presented above by generally comprising a flexible strap having a first end, a second end and a medial portion coupled to and extending between the first end and the second end. The medial portion is configured to extend around a neck of an animal to form a first loop around the animal's neck. The medial portion is configured to extend around a midsection and a back of the animal to form a second loop around the animal's back and midsection. A first connector is coupled to the medial portion. A second connector is coupled to the second end. The first connector is removably couplable to the second connector for securing the strap in a restrained position around a body of an animal.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
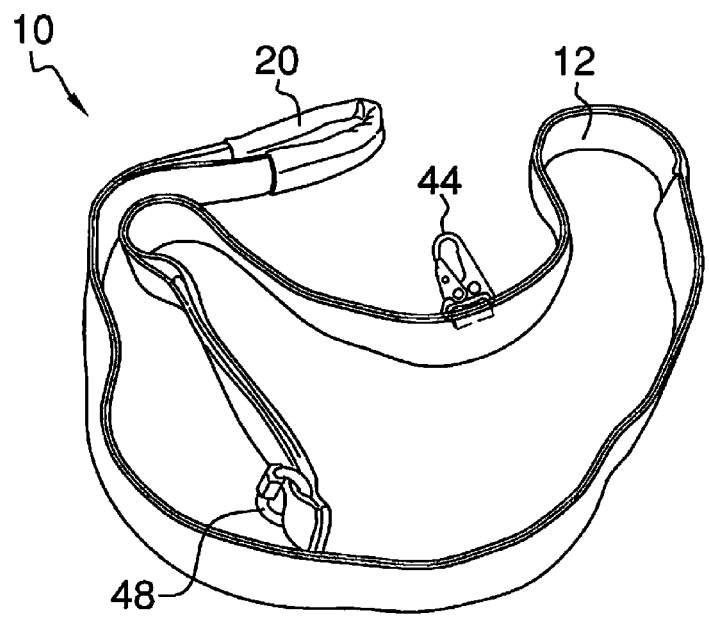
FIG. 1 is a top front side perspective view of a animal restraint device according to an embodiment of the disclosure.
Figure 2:
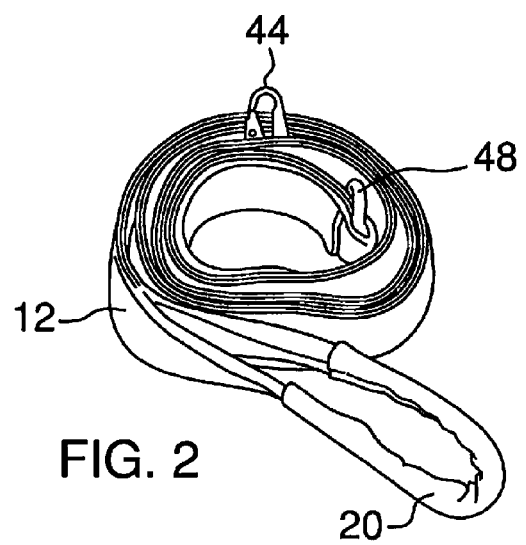
FIG. 2 is a top front side perspective view of an embodiment of the disclosure.
Figure 3:
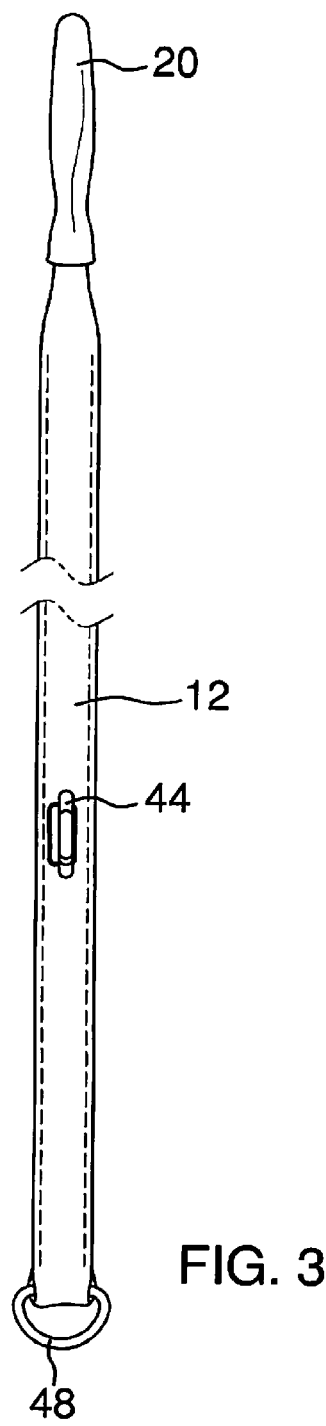
FIG. 3 is a front view of an embodiment of the disclosure.
Figure 4:
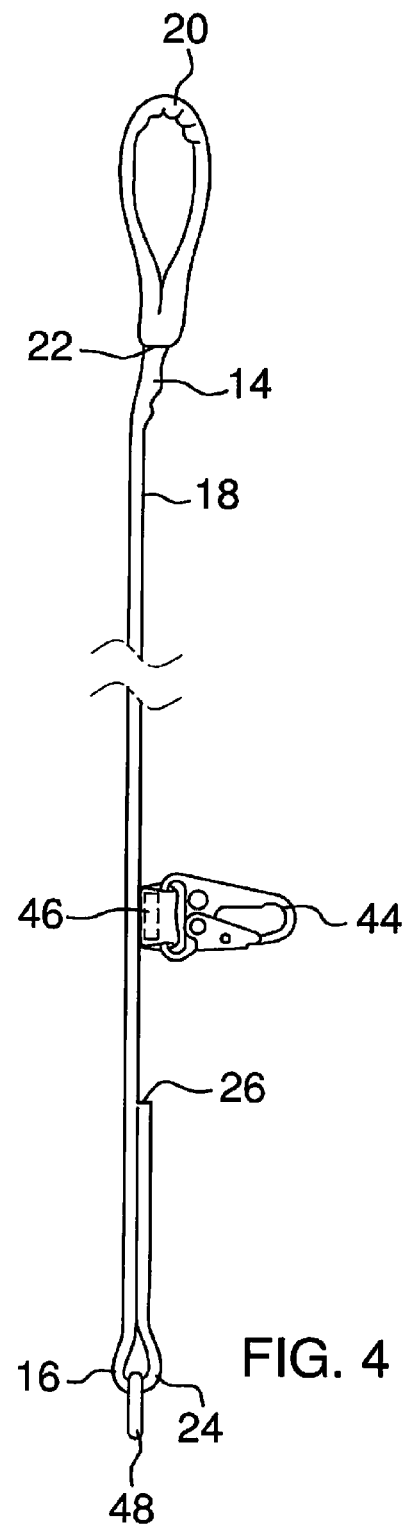
FIG. 4 is a side view of an embodiment of the disclosure.
Figure 5:
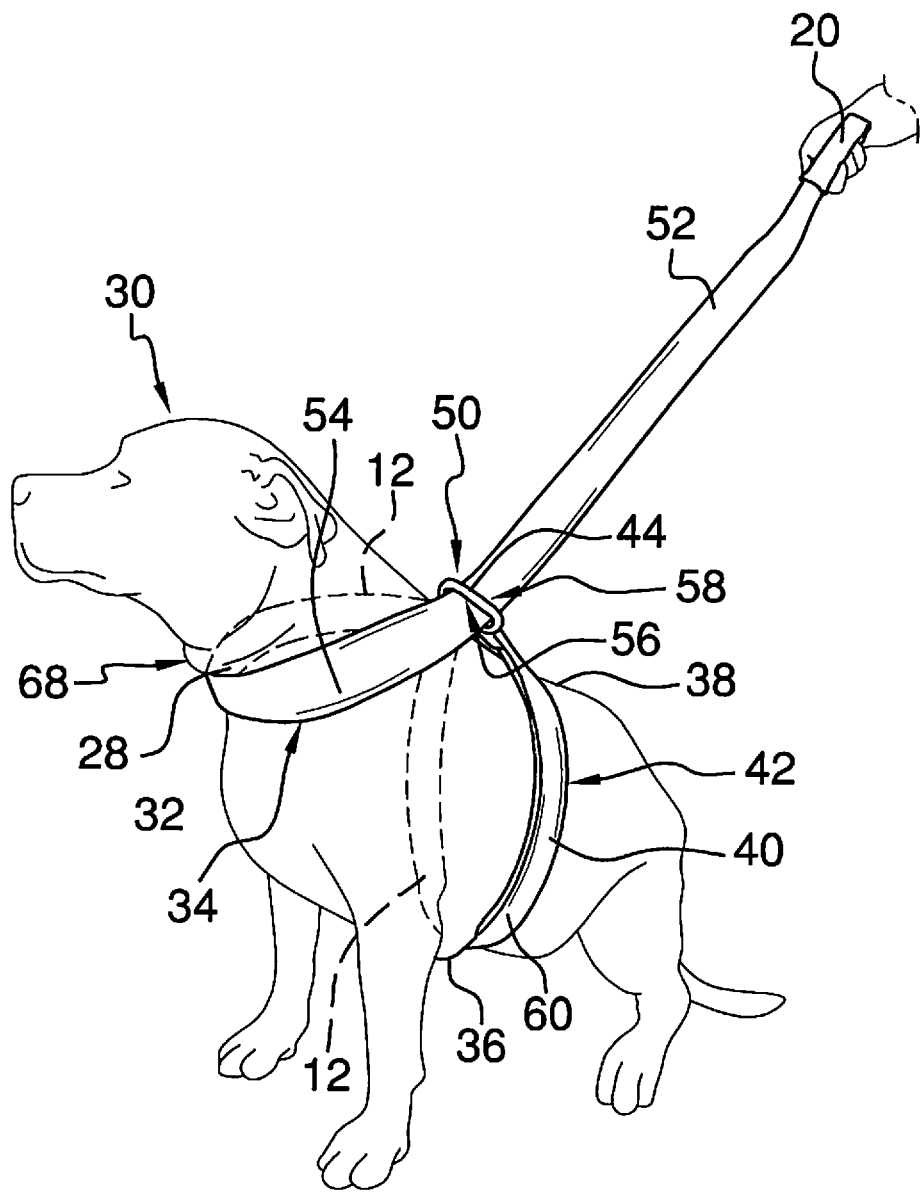
FIG. 5 is an in-use view of an embodiment of the disclosure.
Figure 6:
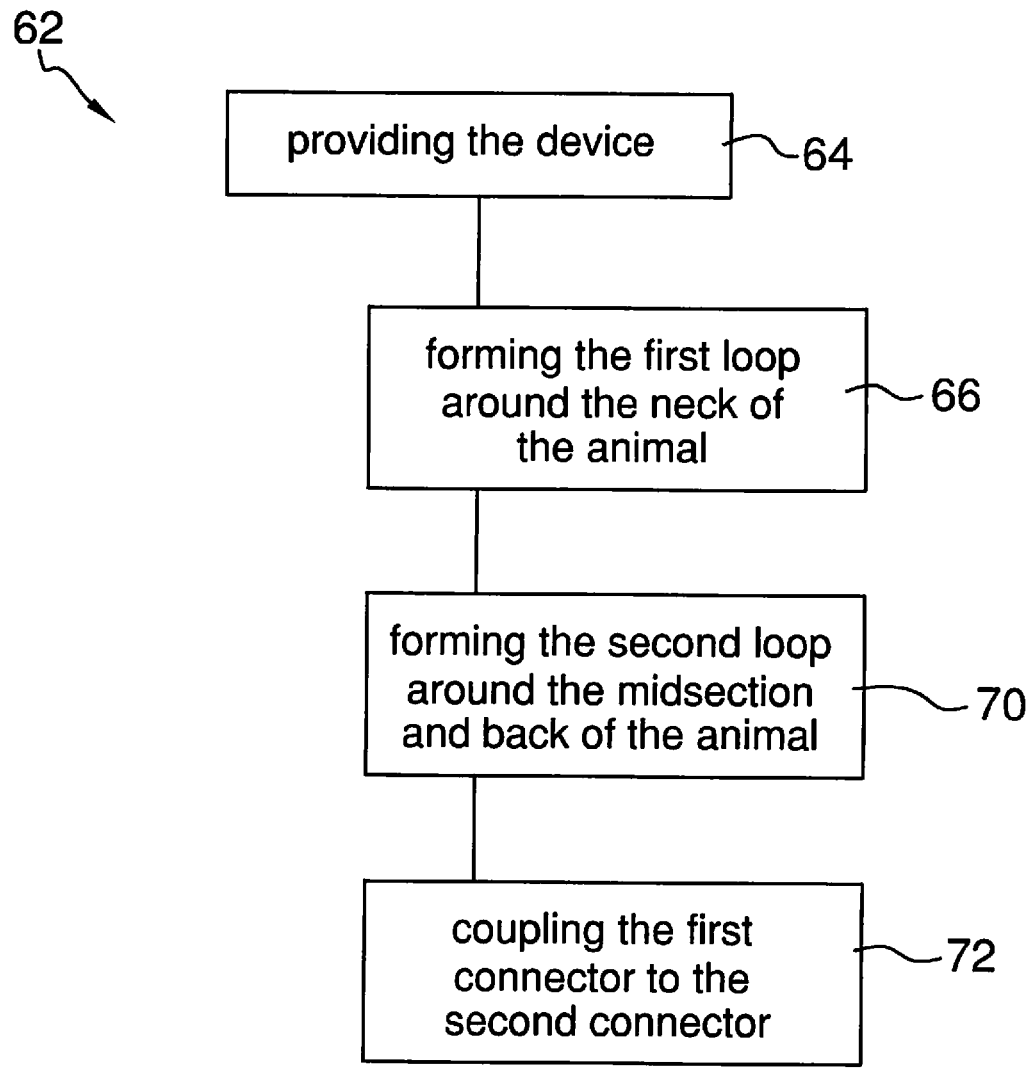
FIG. 6 is a schematic view of the steps of a method of an embodiment of the disclosure.

With reference now to the drawings, and in particular to FIGS. 1 through 6 thereof, a new pet restraining device embodying the principles and concepts of an embodiment of the disclosure and generally designated by the reference numeral 10 will be described.

As best illustrated in FIGS. 1 through 6, the animal restraint device 10 generally comprises a flexible strap 12 having a first end 14, a second end 16 and a medial portion 18 coupled to and extending between the first end 14 and the second end 16. A first band 20 is coupled to the first end 14 of the strap 12. The first band 20 is coupled to an edge 22 of the first end 14. A second band 24 is formed in the second end 16 of the strap 12. An edge 26 of the second end 16 is attached to the medial portion 18 of the strap 12. The medial portion 18 of the strap 12 is configured to extend around a neck 28 of an animal 30 to form a first loop 32 around the neck 28 of the animal 30 defining a collar 34. The medial portion 18 of the strap 12 is configured to extend around a midsection 36 and a back 38 of the animal 30 to form a second loop 40 around the midsection 36 and back 38 of the animal 30 defining a harness 42.

A first connector 44 is coupled to the medial portion 18 of the strap 12. The first connector 44 is positioned nearer to the second end 16 than to the first end 14. In particular, the first connector 44 comprises a clip, such as a caribiner or the like. The first connector 44 is configured for positioning adjacent shoulder blades of the animal 30. A coupler 46 is attached to the medial portion 18 of the strap 12. The coupler 46 releasably couples the first connector 44 to the strap 12. The coupler 46 may comprise a first portion of a hook and loop coupler.

A second connector 48 is coupled to the second end 16 of the strap 12. The second connector 48 is coupled to the second band 24. The first connector 44 is removably couplable to the second connector 48 for securing the strap 12 in a restrained position 50 around a body of the animal 30. The strap 12 is positioned in the restrained position 50 when the strap 12 is positioned to form the collar 34 and the harness 42. The second connector 48 comprises a ring through which strap 12 extends.

A first section 52 of the strap 12 extends from the first connector 44 to the first end 14 of the strap 12. A second section 54 of the strap 12 extends from a first side 56 of the first connector 44 to a second side 58 of the first connector 44 and defines the first loop 32. A third section 60 of the strap 12 extends from the second side 58 of the first connector 44 to the second end 16 of the strap 12 and defines the second loop 40.

In use, the device 10 provides for a method 62 of securing the animal restraint device 10 around the animal 30. A first step 64 is providing the device 10 as described above. Another step 66 is extending the medial portion 18 of the strap 12 from the first connector 44 around a front region 68 of the neck 28 of the animal 30 to form the first loop 32 around the neck 28 of the animal 30. Still another step 70 is extending the medial portion 18 of the strap 12 downwardly around the midsection 36 of the animal 30 and upwardly around the back 38 of the animal 30 to form the second loop 40 around the midsection 36 and back 38 of the animal 30. A final step 72 is coupling the first connector 44 to the second connector 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal restraint device comprising:
a flexible strap having a first end, a second end and a medial portion coupled to and extending between said first end and said second end;
wherein said medial portion of said strap is configured to extend around a neck of an animal to form a first loop around the neck of the animal defining a collar;
wherein said medial portion of said strap is configured to extend around a midsection and a back of the animal to form a second loop around the midsection and back of the animal defining a harness;
a first connector coupled to said medial portion of said strap;
a second connector coupled to said second end of said strap, said first connector being removably couplable to said second connector for securing said strap in a restrained position around the animal, said strap being positioned in the restrained position when said strap is positioned to form said collar and said harness;
wherein a first section of said strap extends from said first connector to said first end of said strap;
wherein a second section of said strap extends from a first side of said first connector to a second side of said first connector and defines said first loop;
wherein a third section of said strap extends from said second side of said first connector to said second end of said strap and defines said second loop; and
a coupler being attached to said medial portion of said strap, said coupler releasably coupling said first connector to said strap, wherein said coupler is a first portion of a hook and loop fastener.

2. The device of claim 1, further comprising a first band coupled to said first end of said strap, said first band being coupled to an edge of said first end.

3. The device of claim 1, further comprising:
a second band being formed in said second end of said strap, an edge of said second end being attached to said medial portion of said strap; and
said second connector being coupled to said second band.

4. The device of claim 1, further comprising said first connector being positioned nearer to said second end than to said first end.

5. The device of claim 1, further comprising wherein said first connector comprises a clip.

6. The device of claim 1, further comprising wherein said second connector comprises a ring.

7. An animal restraint device comprising:
a flexible strap having a first end, a second end and a medial portion coupled to and extending between said first end and said second end;
a first band coupled to said first end of said strap, said first band being coupled to an edge of said first end;
a second band being formed in said second end of said strap, an edge of said second end being attached to said medial portion of said strap;
wherein said medial portion of said strap is configured to extend around a neck of an animal to form a first loop around the neck of the animal defining a collar;
wherein said medial portion of said strap is configured to extend around a midsection and a back of the animal to form a second loop around the midsection and back of the animal defining a harness;
a first connector coupled to said medial portion of said strap, said first connector being positioned nearer to said second end than to said first end, said first connector comprising a clip, said first connector being configured for positioning adjacent shoulder blades of the animal;
a coupler being attached to said medial portion of said strap, said coupler releasably coupling said first connector to said strap, said coupler comprising a first portion of a hook and loop fastener;
a second connector coupled to said second end of said strap, said second connector being coupled to said second band, said first connector being removably couplable to said second connector for securing said strap in a restrained position around the animal, said strap being positioned in the restrained position when said strap is positioned to form said collar and said harness, said second connector comprising a ring;
wherein a first section of said strap extends from said first connector to said first end of said strap;
wherein a second section of said strap extends from a first side of said first connector to a second side of said first connector and defines said first loop; and
wherein a third section of said strap extends from said second side of said first connector to said second end of said strap and defines said second loop.

8. A method of securing an animal restraint device around an animal, the steps of the method comprising:
providing a flexible strap having a first end, a second end and a medial portion coupled to and extending between said first end and said second end, a first connector coupled to said medial portion of said strap, a second connector coupled to said second end of said strap, said first connector being removably couplable to said second connector for securing said strap in a restrained position around a body of an animal, a first section of said strap extending from said first connector to said first end of said strap, a second section of said strap extending from a first side of said first connector to a second side of said first connector and defining a first loop, a third section of said strap extending from said second side of said first connector to said second end of said strap and defining a second loop;
extending said medial portion of said strap from said first connector around a front region of a neck of the animal to form said first loop around the neck of the animal defining a collar;
extending said medial portion of said strap downwardly around a midsection of the animal and upwardly around a back of the animal to form said second loop around the midsection and back of the animal defining a harness; and
coupling said first connector to said second connector.

* * * * *